United States Patent [19]
Greenwald

[11] 3,842,666
[45] Oct. 22, 1974

[54] MECHANICAL FORCE GAUGE

[75] Inventor: Warren E. Greenwald, West Chester, Pa.

[73] Assignee: Vishay Intertechnology, Inc., Malvern, Pa.

[22] Filed: Feb. 22, 1973

[21] Appl. No.: 334,529

[52] U.S. Cl. .............................. 73/141 A
[51] Int. Cl. .............................. G01l 1/04
[58] Field of Search .......... 73/141 A; 177/225, 234

[56] References Cited
UNITED STATES PATENTS

| | | | |
|---|---|---|---|
| 2,635,453 | 4/1953 | Gentry et al. | 73/1 C |
| 3,200,632 | 8/1965 | Grabovac | 73/1 C |
| 3,370,458 | 2/1968 | Dillon | 73/141 A |
| 3,495,453 | 2/1970 | Angeld | 73/141 A |
| 3,713,333 | 1/1973 | MacGeorge | 73/141 A |

Primary Examiner—Charles A. Ruehl
Attorney, Agent, or Firm—Roger Norman Coe; Thomas M. Ferrill, Jr.

[57] ABSTRACT

A mechanical force gauge for measuring opposed forces upon deformation of a fixed end beam. A wedge pin member is located along a neutral axis of at least one leaf member of the fixed end beam. Tensile or compressive forces are determined by measuring the change in position of a contact point located on the wedge pin member as changes in load are applied to the leaf member. This measurement is accomplished by means of a probe attached to an indicating instrument which engages the wedge pin member at the contact point. The relative distance between the wedge pin member and the probe can be adjusted initially to vary the capacity of the gauge and the angle of inclination of the wedge pin member can be adjusted to vary sensitivity of the gauge.

4 Claims, 3 Drawing Figures

MECHANICAL FORCE GAUGE

FIELD OF THE INVENTION

The present invention relates to mechanical type force measuring instruments and more particularly, the present invention concerns improved mechanical type force gauges which are substantially insensitive to moments and forces other than the force which is to be measured.

BACKGROUND OF THE INVENTION

For many years there has been a growing demand for instruments capable of accurately measuring mechanical forces. The conventional type of mechanical gauge which has been used for this purpose employs a U-shaped alloy steel beam. A dial indicator with a plunger resting against one end of the "U" moves in and out depending upon load applied in compression or tension to the "U." Such gauges are, for example, described in U.S. Letters Pat. No. 3,370,458.

One of the principal problems which has been inherently associated with conventional gauges is the fact that it is very difficult to render the gauges insensitive to moments and forces other than the force to be measured. Conventional U-shaped alloy beam gauges can be significantly affected by forces not aligned with the force to be measured. In order to minimize errors caused by misalignment, ball joints have been used in connection with force input means to this type of mechanical force gauge. At best, however, errors are only minimized by this procedure since the point of contact for measurement purposes is far from any neutral axis of the spring element. In compression, use of ball joints on both input ends renders such gauges unstable. If one end is made rigid in order to achieve stability any slightly misalinged load can cause serious error to occur in the output reading.

An additional problem which is inherent with a U-shaped alloy beam gauge is the fact that the weight of the gauge itself must sometimes be taken into consideration and a suitable factor applied in order to compensate for the gauge weight before meaningful measurements can be made, particularly measurements at the low end of the gauge range.

Some electrical type force indicators have been designed for measuring loads. Electrical indicator systems, however, generally are somewhat more expensive than mechanical indicators and require more careful checking than mechanical indicators in order to achieve meaningful measurements and consistent reliability.

SUMMARY OF THE INVENTION

An object of the present invention is to provide an improved mechanical force gauge designed for measuring opposing forces.

Another object of the present invention is to provide a selfcontained load sensing and indicating system.

Still another object of the present invention is to provide a mechanical force gauge in which force measurements are made at the junction of at least one neutral axis of a fixed end beam.

Yet another object of the present invention is to provide a mechanical force gauge capable of making measurements which are not significantly affected by forces other than those aligned with the force to be measured.

A further object of the present invention is to provide a mechanical force gauge which does not require the use of special equipment at force input points in order to minimize measurement errors.

A still further object of the present invention is to provide a mechanical force gauge which can be attached on one side so that the weight of the gauge itself is eliminated from consideration with respect to measurements made by the gauge.

In accordance with the present invention, an improved mechanical force gauge for measuring opposed forces upon deformation of a leaf member of a fixed end beam is disclosed having a wedge pin member which moves with movement of the leaf member. A probe of an indicating instrument is positioned to be in physical contact with the wedge pin at a contact point located along at least one neutral axis of the leaf member. As tensile or compressive loads are applied to the leaf member movement of that member is detected by the indicating instrument due to the contact between its probe and the wedge pin member. By varying the angle of inclination of the wedge pin member, the sensitivity of the gauge can be varied.

BRIEF DESCRIPTION OF THE DRAWINGS

Other and further objects, advantages and features of the invention will be apparent to those skilled in the art in the following detailed description thereof, taken in conjunction with the accompanying drawings in which.

DESCRIPTION OF THE PREFERRED EMBODIMENTS

Figure 1:
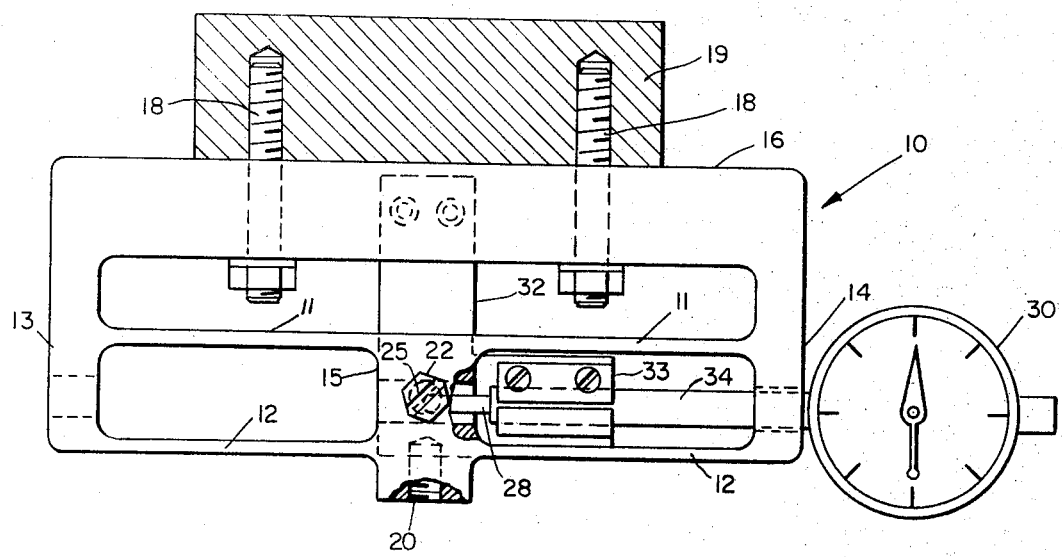
FIG. 1 is a diagrammatic front view, partially broken away, of an improved mechanical force gauge according to the preferred embodiment of the present invention, shown attached to a fixed member illustrated in cross section.
Figure 2:
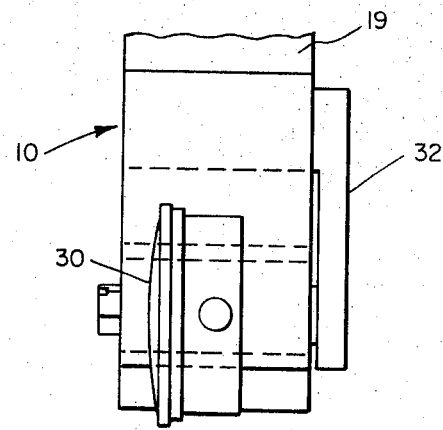
FIG. 2 is a side view of the improved mechanical force gauge illustrated in FIG. 1.

Referring now to the drawings, a mechanical force gauge in accordance with the present invention is illustrated by FIGS. 1 and 2. Mechanical force gauge 10 comprises a H-shaped fixed end resilient beam comprising upper leaf members 11 — 11 and lower leaf members 12 — 12 joined at their ends by end members 13 and 14 and joined at their center by member 15. End members 13 and 14 are also attached to a base member 16 which preferably has greater thickness than the upper and lower leaf members of the H-shaped fixed end resilient beam. The arrangement of leaf members 11 — 11 and 12 — 12 is such that they form a fixed end resilient beam which is actually hollow in two locations. An opening also exists between upper leaf members 11 — 11 and base member 16. This latter opening enables the H-shaped fixed end resilient beam to move a limited distance toward or away from base member 16 depending on the load applied to member 15. The H-shaped fixed end resilient beam can contain means, such as tapped opening 20, designed to receive a force exerting member. If desired, base member 16 can be attached, as shown, to a fixed surface 19 by suitable means, such as bolts 18 — 18, which pass through the base member.

Figure 3:
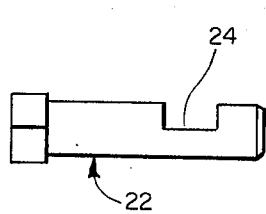
FIG. 3 is a side view of the wedge pin member used in the improved mechanical force gauge of the present invention.

To measure tensile or compressive forces applied to the H-shaped leaves of the fixed end resilient beam which act as the spring element for mechanical force gauge 10 a wedge pin member 22, slideably receivable in member 15, is located along at least one neutral axis of the leaves. As seen in FIG. 3, wedge pin member 22 is provided with a cam face 24. The precise rotative position of wedge pin member 22 can be adjusted by using a screw driver in screw slot 25 and thereafter locked into position by means of a set screw (not shown). Cam face 24 of wedge pin member 22 is designed to cooperate with probe 28 of a conventional large dial faced indicating instrument 30. Preferably, a L-shaped support member 32, attached to the back of base member 16, contains clamp member 33 which holds extension 34 of indicating instrument 30 in such a position that probe 28 contacts cam face 24 inside member 15 without otherwise touching mechanical force gauge 10. Identical openings are present in side members 13 and 14 making the gauge symmetrical and permitting extension 34 to pass freely such that force indicating instrument 30 can optionally be attached to either side of mechanical force gauge 10.

The operation of the improved mechanical force gauge of the present invention can now be described. It will be apparent that by exerting a tensile or compressive force against the H-shaped fixed end resilient beam a corresponding movement of member 15 will occur and wedge pin member 22 will move downwardly or upwardly.

The theoretical relationship between the load carried by mechanical force gauge 10 and the motion of the H-shaped fixed end resilient beam is related to the physical dimensions and material properties of mechanical force gauge 10, as indicated in the two equations set forth below:

$$h = (\theta l) 1/12 (E_y)$$

$$b = 54W (E_y)^2/(\theta l)^3$$

where $h$ = thickness of spring member 12; $b$ = width of spring member 12; $y$ = motion of spring member 12 due to a load W; $W$ = the total force applied to force gauge 10; $\theta$ = the maximum stress in spring member 12 due to load W; $l$ = the length of a flat section of spring member 12; and $E$ = Young's Modulus of elasticity of the material used in the construction of force gauge 10.

As previously indicated, motion upwardly or downwardly of the H-shaped resilient beam will cause a corresponding movement of the wedge pin member 22. Probe 28 of indicator 30 will move away or toward cam face 24, depending on the angle of said cam face and the force applied, to yield a proportionate movement in indicator 30. By rotating wedge pin member 22, e.g., by using a simple screw driver adjustment, probe 28 can be made to always move toward indicating instrument 30. Sensitivity of the gauge can quickly be adjusted by rotating wedge pin member 22 and hence cam face 24 to a slightly different angle and then locking wedge pin member 22 in place using a set screw (not shown). Of course, conventional adjustments can be made to set the intial zero position of dial indicator 30. If desired, the shape of cam face 24 and/or the end of probe 28 which contacts cam face 24 can be changed, for example to obtain increased sensitivity and/or improve linearity.

As will be evident from FIGS. 1 and 2, mechanical force gauge 10 is relatively small in overall height and comprises a complete selfcontained load sensing and indicating system. An important aspect of the mechanical force gauge is that it is not affected by the angle in which it is positioned for use. Since the contact point between cam face 24 and probe 28 is at the junction of three neutral axes of the H-shaped fixed end resilient beam, the force gauge is not significantly affected by forces not aligned with the force to be measured. By bolting mechanical force gauge 10 to a surface (as shown in FIG. 1), the weight of the gauge can be removed from the system while forces coincident with the gauge are accurately measured.

Obviously, the capacity of mechanical force gauge 10 can be varied by substituting different dial indicators and by changing the dimensions of the gauge as well as the type of materials used to construct the gauge. Preferably, mechanical force gauges in accordance with the present invention are constructed of aluminum, but any suitable material can be employed, including steel, wood, plastic and the like. Although not preferred, base member 16 of mechanical force gauge 10 can be a separate piece which is attached to side members 13 and 14.

From the foregoing, it will be seen that this invention is adapted to obtain all of the ends and objects hereinabove set forth, together with other advantages which are obvious and inherent. Improved mechanical force gauges are obtained which are self-contained and which are not significantly affected by forces other than forces aligned with the force to be measured. Because of the construction of the gauges any convenient means of attaching load to the cell for measurement can be utilized, including clevises, hooks, straps, loading balls, and the like.

Obviously, many modifications and variations of the invention as hereinbefore set forth can be made without departing from the spirit and scope thereof and therefore only such limitations should be imposed as are indicated by the appended claims.

What is claimed is:

1. A self-contained load sensing mechanical force gauge comprising:
    a fixed end beam which is fixed at both ends and which is deformable in the direction of loading upon application of a load;
    a member connected to the center portion of the fixed end beam, said member having a cam surface which passes through a contact point located at three neutral axes of the fixed end beam; and
    an indicating instrument having a probe which engages the cam surface at the contact point for measuring the deformation of the fixed end beam at said contact point.

2. A self-contained load sensing mechanical force gauge comprising:
    a fixed end beam comprising two parallel leaves joined together at each end and at the center of said beam, said fixed end beam being deformable in a direction perpendicular to the plane of the parallel leaves upon application of a load;
    a base member attached to each end of the fixed end beam in such a manner to permit unimpaired deformation of said fixed end beam;

an adjustable member connected to the center portion of the fixed end beam, said member having a cam surface which passes through a contact point located at three neutral axes of the fixed end beam; and an indicating instrument having a probe in engagement with the cam surface of the adjustable member at the contact point for measuring deformation of the fixed end beam.

3. A self-contained load sensing mechanical force gauge of claim 2 in which the probe of the indicating instrument lies parallel to the leaves of the fixed end beam.

4. A self-contained load sensing mechanical force gauge of claim 2 in which the only contact between the indicating instrument and the fixed end beam is at said contact point.

* * * * *